United States Patent
Consiglio et al.

(10) Patent No.: US 6,560,333 B1
(45) Date of Patent: May 6, 2003

(54) MOS TRANSISTORS SUBSTITUTE CIRCUIT HAVING A TRANSFORMER/DATA INTERFACE FUNCTION, PARTICULARLY FOR ISDN NETWORKS AND CORRESPONDING CONTROL AND DRIVING SWITCH CONFIGURATION

(75) Inventors: Pietro Consiglio, Milan (IT); Ferdinando Lari, Milan (IT); Carlo Antonini, Venegono Inferiore (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 0 days.

(21) Appl. No.: 09/159,526

(22) Filed: Sep. 23, 1998

(30) Foreign Application Priority Data

Sep. 23, 1997 (EP) ............................. 97830462

(51) Int. Cl.[7] .......................... H04M 19/00; H04M 3/00
(52) U.S. Cl. ........................................ 379/413; 379/405
(58) Field of Search .......................... 307/64; 379/413, 379/405; 370/200

(56) References Cited

U.S. PATENT DOCUMENTS

| | | | | |
|---|---|---|---|---|
| 3,649,769 A | | 3/1972 | Pest ............................. | 179/77 |
| 4,173,714 A | * | 11/1979 | Bloch et al. ................. | 370/200 |
| 4,588,858 A | * | 5/1986 | Watts et al. ................. | 330/260 |
| 4,825,349 A | | 4/1989 | Marcel ........................ | 363/50 |
| 5,321,317 A | * | 6/1994 | Pascucci et al. ............ | 327/143 |
| 6,215,329 B1 | * | 4/2001 | Campardo et al. ........... | 326/86 |
| 6,222,414 B1 | * | 4/2001 | Cini et al. .................. | 327/108 |

FOREIGN PATENT DOCUMENTS

EP       0160411       11/1985

OTHER PUBLICATIONS

Zehethofer G: "Voltage Supply in ISDN" Siemens Components vol. 24 No. 3, Jan. 1, 1989 pp. 106–108.
French Search Report dated Feb. 23, 1998.

* cited by examiner

Primary Examiner—Forester W. Isen
Assistant Examiner—Daniel Swerdlow
(74) Attorney, Agent, or Firm—Lisa K. Jorgenson; Stephen Bongini; Fleit, Kain, Gibbons, Gutman & Bongini P.L.

(57) ABSTRACT

The invention relates to a MOS transistors substitutive circuit having a transformer/data interface function, in particular for ISDN networks, comprising first (11a) and second (11b) power supply/transmitter blocks, the first power supply/transmitter block (11a) being connected between a voltage reference (V) and a first data interface (RX), and the second power supply/transmitter block (11b) being connected between a ground potential reference (GND) and a second data interface (TX), both power supply/transmitter blocks being connected to a supply voltage reference (VDD). The MOS transistors substitutive circuit according to the invention comprises first (12) and second (12') MOS transistor pairs connected to the voltage reference (V), the MOS transistors being diode configured and held in their saturation range, so as to have a high A.C. impedance and virtually zero D.C. impedance, thereby minimizing power dissipation through the substitutive circuit.

The invention also concerns a control and driving switch configuration for a network termination of at least first (11) and second (11') MOS transistors substitutive circuits according to the invention, operating respectively in a first condition ("normal condition") of operation of the network termination characterized by the presence of the polarity reverse control signal (Scrp), and a second condition ("RM emergency condition") of operation of the network termination characterized by the absence of the polarity reverse control signal (Scrp). The control configuration selects the voltage reference being applied to the power supply/transmitter blocks.

34 Claims, 8 Drawing Sheets

MOS TRANSISTORS SUBSTITUTE CIRCUIT HAVING A TRANSFORMER/DATA INTERFACE FUNCTION, PARTICULARLY FOR ISDN NETWORKS AND CORRESPONDING CONTROL AND DRIVING SWITCH CONFIGURATION

CROSS REFERENCE TO RELATED APPLICATIONS

This application is based upon and claims priority from prior European Patent Application No. 97-830462.4, filed Sep. 23, 1997, the entire disclosure of which is herein incorporated by reference.

BACKGROUND OF THE INVENTION

1. Field of the Invention

This invention relates to a MOS transistors substitutive circuit having a transformer/data interface function, particularly for ISDN networks, and corresponding control and driving switch configuration.

The invention particularly, but not exclusively, concerns an ISDN network termination, and the description that follows will make reference to that application for simplicity of illustration.

2. Description of the Related Art

As is well known, technological advancements in the telephone field have made it necessary to provide telephone terminal units with additional functions.

An important additional function is, besides voice transmission, the transmission of information relating to new products and/or services, such as facsimile operations, video communications, network interconnections, etc.

The transmission of data by a telephone terminal unit may utilize special networks. One example of a well known and widely utilized network is the ISDN (Integrated Services Digital Network), originating by natural evolution from the traditional telephone network and employing the same standard cables. This compatibility of transmission with the traditional telephone network allows the ISDN network to use the so-called telephone loops, which are advantageously available throughout the territory.

In addition, the ISDN network has a European standard, having a transmit rate of 64 kbit/sec; the ISDN network allows two talk channels plus a control and service channel to be sent over the same line, which channels can be either used by two telephone sets, or one telephone set and a facsimile, or one telephone set and a PC (Personal Computer).

Figure 1:
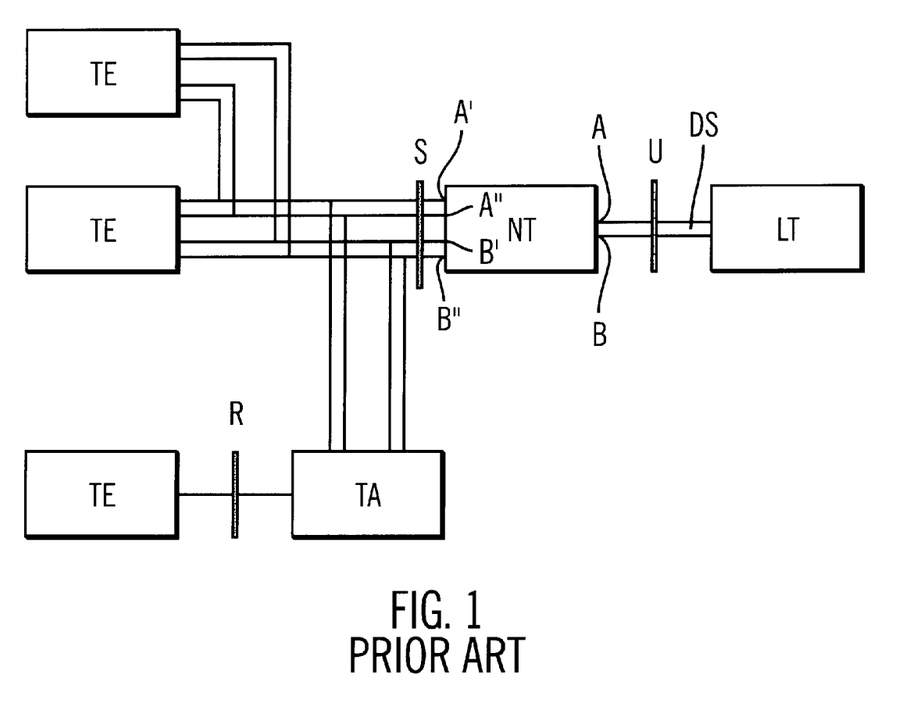
FIG. 1 shows a block diagram for basic access to the ISDN network according to the prior art.

Shown by way of example in FIG. 1 is a block diagram for basic access to the ISDN network. This diagram is also shown in FIG. 2, in greater detail.

The following main blocks can be distinguished in these figures:

LT—line termination;
NT—network termination;
TE—terminal apparatus;
TA—terminal adapter.

Figure 2:
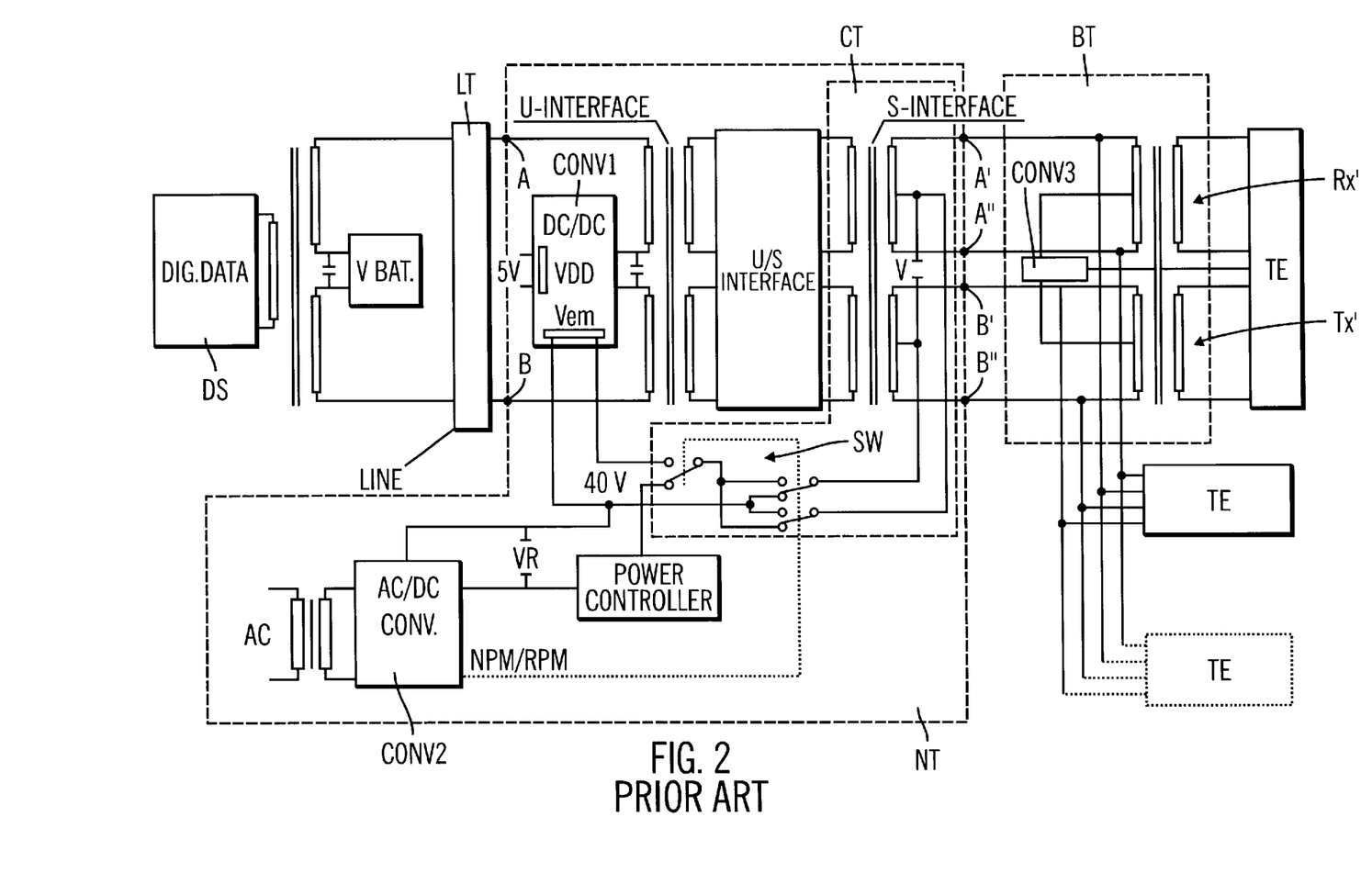
FIG. 2 shows the diagram of FIG. 1 in further detail.

Also shown in FIG. 1 are first U, second S and third R reference points, whereat special interface circuits are connected, as detailed in FIG. 2 for the references U and S only.

In particular, the line termination LT provides for power supply in the remote mode to the network termination NT, and in an emergency condition known in the art as RM (Restricted Mode), for a terminal apparatus TE as well.

Furthermore, the line termination LT allows signal data DS to be transmitted and received in suitable formats, such as the 2B1Q or 4B3T formats, through the interface circuits of the reference point U.

The terminal adapter TA, connected in the reference point R, allows apparatus designed for different data transmission modes, usually commercially available apparatus, to be also connected to the network termination NT.

The network termination NT is connected to the line termination LT by a tow-wire telephone loop, whereby the network termination NT can be powered from the line termination LT and can exchange with it data DS simultaneously in either direction.

The network termination NT is provided with a DC/DC converter CONV1 capable of delivering a supply voltage VDD, typically of 5V, to the interface circuits at the reference points U and S, as well as an emergency voltage Vem.

The emergency voltage Vem, of about 40V, can only be used in an RM emergency condition to power the terminal apparatus TE, with some suitable constraints. Such terminal apparatus TE are normally powered from an AC/DC converter CONV2 provided at the network termination NT and capable of powering up to eight terminal apparatus TE, according to the standard applied. Under normal operation conditions, the emergency voltage Vem is disconnected by means of a first switch arrangement SW, shown in FIG. 2, which is closed at the AC/DC converter CONV2.

As shown in detail in FIG. 2, the network termination NT has two input terminals A, B and four output terminals A', A" and B', B", two for each transformer of the interface circuit at the reference point S, as previously shown schematically in FIG. 1. The output terminals A', A" and B', B" provide for remote power supply and data transmission through a supply/data transmission block BT comprising a DC/DC converter CONV3, a transmit block TX', and a receive block RX', so as to communicate with the terminal apparatus TE. The transmit and receive blocks, TX', RX' are schematically represented in FIG. 2 by simple transformers serving to receive the power supply and allow conversion of the data present in the transmit and receive blocks TX', RX'.

In particular, it should be noted that power to the terminal apparatus TE is supplied from the interface circuits at the reference point S by means of the transformers, shown schematically in FIG. 2, which are also utilized for exchanging the signal data DS. These transformers allow a virtually zero DC voltage drop to be obtained, and have an AC impedance which is a function of load and the winding ratio of the transformer. In addition, the supply to the terminal apparatus TE under RM emergency conditions is controlled through the switches SW.

The combination of the transformers in the interface circuits at the reference point S and the switches SW controlling the supply to the terminal apparatus TE form a transformer/data interface/switch circuit for effecting a polarity reversal CT.

The use of transformers, for powering or effecting the exchange of signal data DS at the interface circuits, is specially convenient from the standpoint of energy dissipation. Minimizing energy dissipation is highly important under RM emergency conditions; in such circumstances, in fact, no mains supply would be available, and the available power would be limited to the small power that the DC/DC converter at the interface circuits of the reference point U can draw on the line.

Examples of circuits which employ such transformers are described in European Patents No. 0 160 411 to Northern Telecom Limited and No. 0 639 021 and No. 0 590 242 to DeTeWe—Deutsche Telephonwerke Aktiengesellschaft & Co.

However, these transformers must be designed to meet specific applicational requirements, thereby producing a manufacturing cost.

Also known is to use circuits including active components to provide equivalent coils in place of the transformers. Examples of such circuits are described in U.S. Pat. No. 3,649,769 to Pest, U.S. Pat. No. 4,004,104 to Picandet et al., U.S. Pat. No. 3,943,432 to Colardelle et al., and U.S. Pat. No. 4,088,843 to Rogers et al.

The prior art active component circuits are less expensive than transformers. But they are unsatisfactory from the energy dissipation standpoint, and still require suitable switches for supply control.

The underlying technical problem of this invention is to provide a transformer/data interface circuit emulating a transformer for an ISDN telephone line, which can transmit the data presented on the line, transmit and control the power supply to the terminal apparatus (reversal of current polarity or direction), and has suitable structural and functional features to afford reduced energy consumption and overcome the drawbacks that are still besetting the prior art devices.

SUMMARY OF THE INVENTION

Briefly, according to one aspect of the invention, a MOS transistors substitutive circuit having a transformer/data interface function, in particular for ISDN networks, comprises a voltage reference terminal, a supply voltage reference terminal, a ground potential reference terminal, a first data interface, and a second data interface. The circuit also comprises a first power supply/transmitter block and a second power supply/transmitter block. The first power supply/transmitter block is connected between the voltage reference terminal and the first data interface, and is further connected to the supply voltage reference terminal. The second power supply/transmitter block is connected between the ground potential reference terminal and the second data interface, and is further connected to the supply voltage reference terminal. The circuit also comprises a first MOS transistor, a second MOS transistor, a third MOS transistor, and a fourth MOS transistor. Both the first and second MOS transistors are each coupled between the voltage reference terminal and the first data interface. Both the third and fourth MOS transistors are each coupled between the ground potential reference terminal and the second data interface. All four transistors are configured as diodes.

DETAILED DESCRIPTION OF AN EMBODIMENT

The embodiment relates to a MOS transistors substitutive circuit having a transformer/data interface function, particularly for ISDN networks, which circuit comprises first and second power supply/transmitter blocks, said first power supply/transmitter block being connected between a voltage reference and a first data interface, and said second power supply/transmitter block being connected between a ground potential reference and a second data interface, said first and second power supply/transmitter blocks being further connected to a supply voltage reference.

The embodiment also relates to a control and driving switch configuration for substitutive transformer/data transmitter circuits in a network termination, in particular ISDN network terminations, said network termination including first and second converters connected to a ground potential reference, said first converter delivering a supply voltage and an emergency voltage and said second converter delivering a remote supply voltage.

The idea of solution behind the preferred embodiment is that circuits, comprising MOS transistors which operate in the saturation range, and are suitably configured as diodes through common resistors, substitute for the transformer/data interface/switch circuit comprising the combined transformers and power supply control switches as provided at the network termination in the prior art, so as to present a high A.C. impedance and virtually zero D.C. impedance, thus minimizing the overall dissipation of power by the network termination, and allowing the power supply to be controlled under any conditions of operation of the network termination, while effecting the reversal in the current direction.

Based on this idea of solution, the technical problem is, at least partially, solved by a MOS transistors substitutive circuit having a transformer/data interface function. The problem is also solved, at least partially, by a control and driving switch configuration for substitutive transformer/data transmitter circuits in a network termination. The control configuration selects the voltage reference to be applied to the power supply/transmitter blocks.

The features and advantages of the substitutive transformer/data interface circuit and associated control and driving switch configuration will be apparent from the following description of embodiments thereof, given by way of non-limitative examples with reference to the accompanying drawings.

Figure 3:
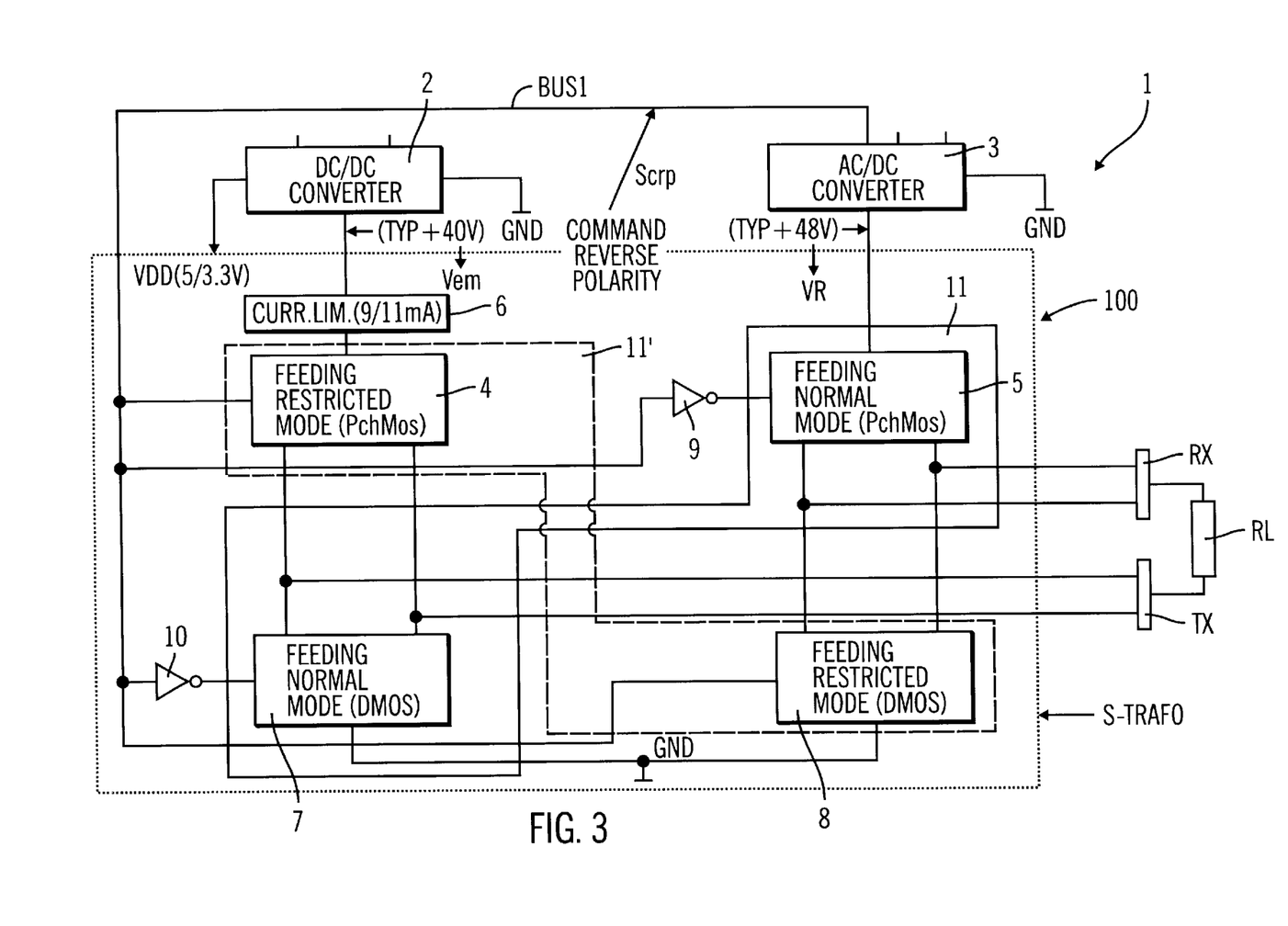
FIG. 3 shows a block diagram of a network termination incorporating a control and driving switch configuration according to the invention.

Referring to the drawings, specifically to FIG. 3, generally and schematically shown at 1 is a network termination according to the invention, wherein the transmission of data is not illustrated.

FIG. 3 illustrates in particular a power supply distribution through the network termination 1, comprising first 2 and second 3 converters, specifically a DC/DC converter and an AC/DC converter. The architecture of the network termination 1 of FIG. 3 may also be used for data transmission.

The first DC/DC converter 2 is connected to a ground potential reference GND, and delivers a supply voltage VDD, e.g. of either 5V or 3.3V, and an emergency voltage Vem, typically of 40V, similar to the DC/DC converter CONV1 described above in connection with the prior art. The second AD/DC converter 3 is connected to the ground potential reference GND and issues a polarity reversal control signal Scrp and a remote supply voltage VR, typically of 48V, on a signal line BUS1.

The first 2 and second 3 converters are also connected to a first RM emergency condition supply block 4 and a second normal condition supply block 5, respectively, comprising P-channel MOS or PMOS transistors.

In particular, connected between the first DC/DC converter 2 and the first supply block 4 is a current limiter 6 which is set, for example, to a value in the 9 mA to 11 mA range, harmonizing with regulations.

The first 4 and second 5 supply blocks are connected to a third normal condition supply block 7 and a fourth RM emergency condition supply block 8, respectively, which comprise N-channel MOS or NMOS transistors.

The third 7 and fourth 8 supply blocks are also connected to the ground potential reference GND.

In addition, the first 4 and fourth 8 supply blocks are connected directly to the signal line BUS1, while the second 5 and third 7 supply blocks are connected thereto through first 9 and second 10 logic inverters.

Last, the second 5 and fourth 8 supply blocks are connected to a first data interface RX, and the first 4 and third 7 supply blocks are connected to a second data interface TX.

The block RL, schematically shown in FIG. 3 as being connected to the data interface RX and TX, represents an equivalent DC resistor of a power supply/data transmission receive block connected to these interfaces and needed by the terminal apparatus TE.

In essence, the network termination 1 comprises first 11 and second 11' MOS transistors substitutive circuits having a transformer/data interface function, respectively comprising normal condition supply blocks 5, 7 and RM emergency condition supply blocks 4, 8.

In particular, the emergency voltage Vem and remote supply voltage VR are respectively applied to the supply blocks 5, 7 and 4, 8 in a first condition of operation, referred to as the normal operation condition, and in a second condition of operation, referred to as the emergency condition, of the network termination 1.

Figure 4:
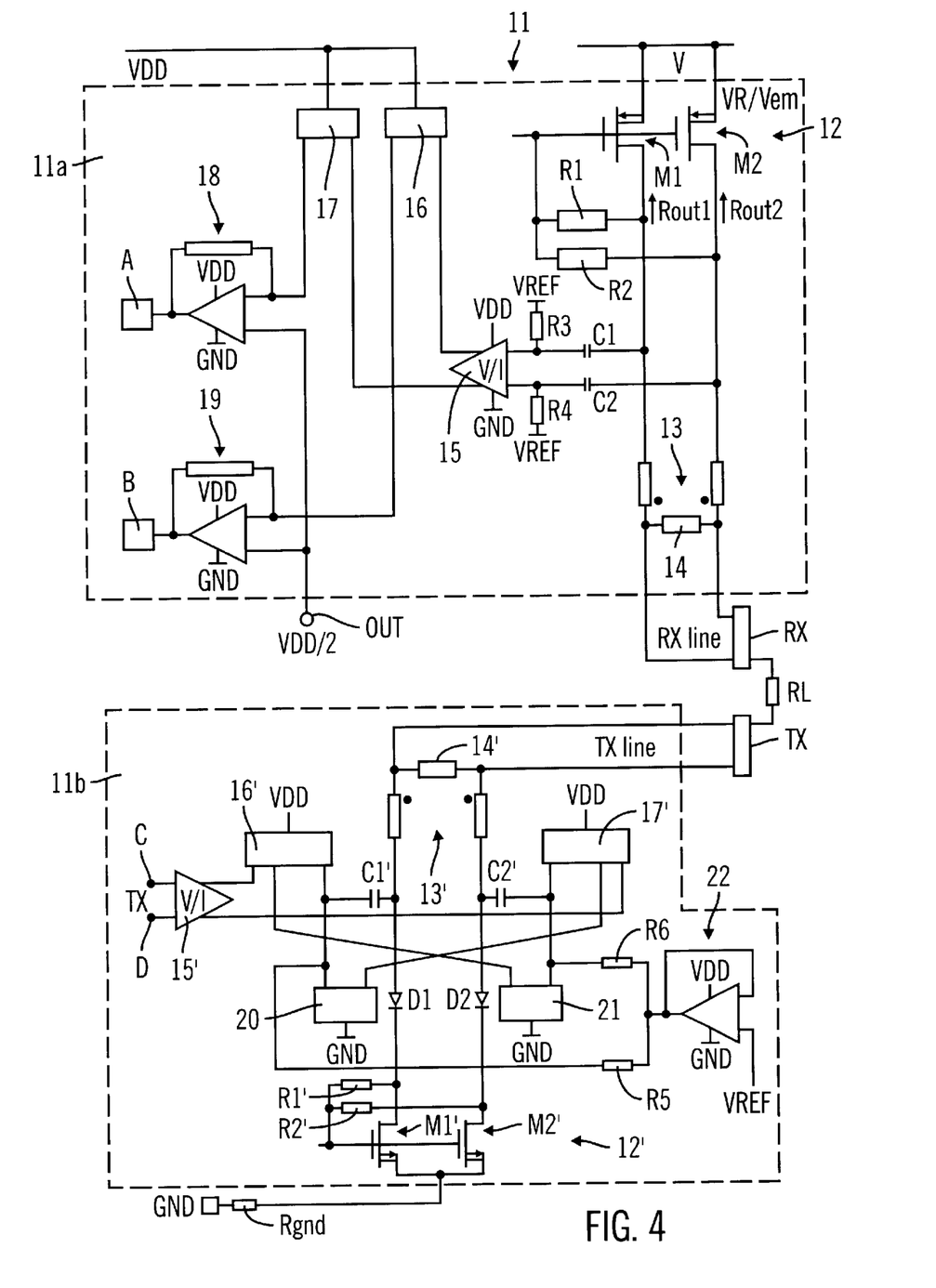
FIG. 4 shows a substitutive transformer/data interface circuit according to the invention.

A MOS transistors substitutive circuit having a transformer/data interface function, according to the invention, is shown best in FIG. 4.

The substitutive circuit 11 comprises first 11a and second 11b power supply/transmitter blocks, which essentially correspond to the first supply block 4 in the RM emergency condition, or to the second supply block 5 in the normal condition, and to the fourth supply block 8 in the RM emergency condition, or the third supply block 7 in the normal condition, respectively. This substitutive circuit 11 is implemented by a first pair 12 of P-channel MOS or PMOS transistors, and a second pair 12' of N-channel MOS or NMOS transistors.

In particular, the transistors of each pair 12, 12' draw the same DC current in the connection leads to the first RX and second TX data interfaces.

In addition, the first 12 and second 12' MOS transistor pairs are easily constructed from basic components made available by conventional mixed technologies of the BCD type.

The diagram of FIG. 4 shows that either (respectively PMOS and NMOS) transistor pairs 12, 12' are diode connected through suitable connection resistors.

In particular, the first transistor pair 12 of the first power supply/transmitter block 11a comprises first M1 and second M2 P-channel transistors which are connected to a voltage reference V corresponding either to the remote supply voltage VR or the emergency voltage Vem, according to the operation condition of the network termination whereto the substitutive transformer/data interface circuit 11 is incorporated. The first M1 and second M2 transistors are also connected to the first data interface RX, and have their gate terminals in common and connected to the respective drain terminals through first R1 and second R2 connection resistors.

The drain terminals of the transistors M1 and M2 are connected to the first data interface RX through a suitable decoupling circuit 13 which comprises at least one cross-connection resistor 14 and suitable common mode inductors. The drain terminals of the transistors M1 and M2 are also connected to a voltage/current converter 15 through first C1 and second C2 decoupling capacitors, respectively, which capacitors are further connected to a reference voltage reference VREF through first R3 and second R4 bias resistors.

The voltage/current converter 15 is connected between the supply voltage reference VDD and the ground potential reference GND, and further connected to the supply voltage reference VDD via first 16 and second 17 current mirrors.

The first 16 and second 17 current mirrors are connected to first 18 and second 19 amplifier circuits which are connected between the supply voltage reference VDD and the ground potential reference GND and connected, in parallel with each other, to a control terminal OUT whereat a voltage value equal to one half the supply voltage VDD is present.

Also present between the output terminals A and B of the amplifier circuits 18 and 19 is an output voltage which is proportional to the voltage present on the line, limited to the conditions of the signal AC; this output voltage can be modulated by means of the current mirrors 16 and 17 and the resistors included in the amplifier circuits 18 and 19.

Likewise, the second transistor pair 12' of the second power supply/transmitter block 11b comprises first M1' and second M2' N-channel transistors being connected between the ground potential reference GND and the second data interface TX and having their gate terminals in common and connected to the respective drain terminals through first R1' and second R2' connection resistors.

The first M1' and second M2' transistors have their source terminals in common and connected, through a suitable sensing resistor Rgnd (unessential to the aim of the invention), to the ground potential reference GND, and have their drain terminals connected to first D1 and second D2 decoupling elements, e.g. two diodes, and connected to the second data interface TX via a suitable decoupling circuit 13' which comprises at least one cross-connection resistor 14' and suitable common mode inductors. The drain terminals of the transistors M1' and M2' are also connected, through the decoupling elements D1 and D2, to first 16' and second 17' current mirrors which are further connected to the supply voltage reference VDD and decoupled from the second data interface TX by means of first C1' and second C2' decoupling capacitors.

The decoupling elements D1 and D2 operate in particular supply conditions of the substitutive circuit 11.

The first C1' and second C2' decoupling capacitors are also connected to the ground potential reference GND through third 20 and fourth 21 current mirrors.

The first 16' and second 17' current mirrors are connected to both the third 20 and fourth 21 current mirrors in crossed manner, thereby forming a "bridge" connection.

The first 16' and second 17' current mirrors are also connected to a buffer circuit 22 through first R5 and second R6 decoupling resistors, respectively, and connected to a voltage/current converter 15' which has first C and second D input terminals.

The buffer 22 is connected between the supply voltage reference VDD and the ground potential reference GND, and connected to the reference voltage reference VREF.

In particular, the buffer 22 sets the output reference voltage VREF for the current mirrors 16', 17', 20 and 21. The decoupling resistors R5 and R6 will then establish an impedance between the current mirrors 17', 21 and 16', 20, respectively, suitable to provide, in a condition of AC current, a higher impedance value than the resistance value of the cross-connection 14' in the decoupling circuit 13'.

The buffer 22 thus will, in connection with the decoupling resistors R5 and R6, set the working voltage of the current mirrors without altering the line impedance value across the cross-connection resistor 14'.

In particular, the reference voltage VREF is one half the supply voltage VDD.

The operation of the MOS transistors substitutive circuit according to the invention in the presence of a DC supply signal and a differential type of data signal will now be described.

Data Transmission Function

A differential data signal, specifically a voltage, presented across the cross-connection resistor 14 of the decoupling circuit 13 associated with the first data interface RX, will "see" a high impedance through the transistors M1 and M2, and especially through the parallel connection of the resistors R1, R2, R3 and R4.

This differential data signal then travels through the decoupling capacitors C1 and C2 to the voltage/current converter 15, where it is converted to a current.

The differential current data signal then goes through the current mirrors 16 and 17 to be ultimately converted back to a voltage by the amplifier circuits 18 and 19.

In this way, the differential data signal associated with the first data interface RX will again be presented, suitably amplified, at the output terminals A and B of the amplifier circuits 18 and 19.

In particular, it should be noted that the final amplification value of the differential data signal can be programmed by varying the ratio of the current mirrors 16, 17 and the resistance values used.

In a dual manner, a differential data signal, such as a voltage, at the input terminals C and D of the voltage/current converter 15' in the second power supply/transmitter block 11b is converted to a current and transmitted to the bridge configuration of the current mirrors 16', 17', 20 and 21.

In particular, if the differential data signal converted to a current has a first polarity, it is input, through the decoupling capacitor C1' connected to the first current mirror 16', to a first terminal of the cross-connection resistor 14' of the decoupling circuit 13' associated with the second data interface TX, to then loop back to ground through the decoupling capacitor C2' and the fourth current mirror 21.

Thus, the second power supply/transmitter block 11b can be said to replicate, at the second data interface TX, the differential data signal presented to the input of the voltage/current converter 15'. This differential data signal is output with said first polarity.

Otherwise, if the differential current data signal has a second polarity, in particular a reversed polarity from the first, it is input, through the decoupling capacitor C2' connected to the second current mirror 17', to a second terminal of the cross-connection resistor 14' of the decoupling circuit 13' associated with the second data interface TX, to then loop back to ground through the decoupling capacitor C1' and the third current mirror 20.

Accordingly, the connection to the cross-connection resistor 14' is the reverse from the previously discussed differential data signal having a first polarity, and the second power supply/transmitter block 11b will replicate the differential data signal, presented to the input of the voltage/current converter 15' and having said second polarity, at the second data interface TX.

Transformer Function

In the instance of a DC supply, a corresponding DC supply current will be flowing through the transistors M1, M2 toward the decoupling circuit 13, up to the first data interface RX.

In a DC supply situation, the transistors M1 and M2 would offer, in fact, a low resistance to the passage of said supply current.

The mid-point terminal of the interface transformers in the first data interface RX is suitably connected to the mid-point terminal of the interface transformers in the second data interface TX, thereby allowing the supply current to cross the decoupling circuit 13'. The equivalent resistance of this connection is schematically represented by the block RL in FIG. 4.

The supply current path then loops back to ground through the transistors M1' and M2'.

The MOS transistors substitutive circuit of the invention replaces, therefore, the transformers associated with the interface at the reference point S in the prior art.

Switch Function

Reference will now be made to the control and driving switch configuration 100 shown schematically in FIG. 3.

In the normal operation condition, i.e. for a remote supply voltage VR of about 48V, this voltage is crossed through the first normal condition supply block 5 to the first data interface RX. It is then crossed to ground by the second data interface TX through the second normal condition supply block 7.

Otherwise, in the absence of the remote supply voltage VR, the polarity reversal control signal Scrp on the signal line BUS1 will activate the emergency condition supply blocks, 4, 8 (connected to the emergency voltage Vem of about 40V), and simultaneously deactivate the normal condition supply blocks 5, 7 by means of the inverters 9 and 10.

In particular, this control on the supply distribution for the normal and emergency conditions is effected through the transistors of the substitutive circuits 11 and 11'.

In fact, these transistors are either connected to the remote supply voltage VR outgoing from the AC/DC converter 3 or the emergency voltage Vem, to activate and deactivate operation of the first and second supply blocks 5, 7 in the normal operation condition, or operation of the first and second supply blocks 4, 8 in the RM emergency condition.

The control and driving switch configuration, comprised of a pair of MOS transistors substitutive circuits according to the invention, thus replaced functionally the switches SW of the prior art.

Advantageously in this invention, the resistances of the first R1 and second R2 connection resistors for the first pair of MOS transistors M1, M2 are identical (R1=R2). Likewise, the values of the first R1' and second R2' connection resistors for the second MOS transistor pair M1', M2' are identical (R1'=R2'). As such, any differential signal presented to the first RX and second TX data interfaces would be canceled at the common gate terminal of the respective MOS transistor pairs 12 and 12'.

In principle, therefore, it would be necessary to use a filter capacitor between the common gate terminal and the source terminal of the transistors in the first 12 and second 12' pairs of MOS transistors. Such a filter capacitor may be used, however, in case of any mismatching of the resistors, in order to increase the output impedances of the MOS transistor pairs 12 and 12'.

It should be noted that in the substitutive circuit 11 of this invention, even a differential signal on the line (to be regarded as similar to the signals presented to the first RX and second TX data interfaces) would fail to modulate the common gate terminal of the MOS transistor pairs 12 and 12'. These MOS transistor pairs 12 and 12' have, therefore, a high impedance to differential signals, which is equal to the combined output impedance of the MOS transistor pair, 12 or 12', under consideration.

The output impedance gd of a single MOS transistor is given as:

$$gd = 1/Rout = \text{delta } Id/\text{delta } Vds$$

where:

Rout is the equivalent output resistance of each MOS transistor;

delta Id is the variation in the current flowing through the MOS transistor pairs 12 and 12';

delta Vds is the variation in the voltage across the MOS transistor pairs 12 and 12'.

On the other hand, the DC current flowing through the transistor pairs 12 and 12' can easily be looped back within such diode-connected pairs.

Under these conditions, the MOS transistors M1, M2, M1' and M2' operate in the saturation range, and the voltage Vgs=Vds will match the appropriate value, for the current present within the host system of the substitutive circuit 11 to be allowed to flow.

In fact, a MOS transistor will be operating in the saturation range once the following relations are satisfied:

$$|VGS| > |VT| \quad (1.1)$$

$$|VDS| > |VGS| - |VT| \quad (1.2)$$

where:

VGS is the difference in voltage between the gate terminal and the source terminal of the MOS transistor;

VT is the threshold voltage of the MOS transistor;

VDS is the difference in voltage between the drain terminal and the source terminal of the MOS transistor.

Figure 5:
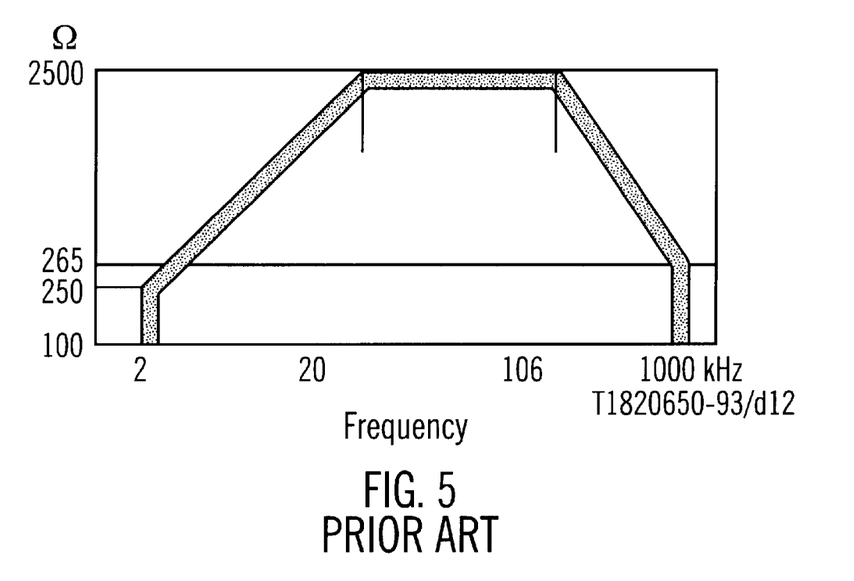
FIG. 5 illustrates in graphical form an international specification for the impedance values of the interface circuits incorporated in the substitutive circuit of FIG. 4.

To conform with the regulations on interface circuits, specifically the interface circuit at point S, an overall impedance value Z must be in agreement with the graph of FIG. 5.

This graph is taken from Specification ITU-T I430 and fixes an impedance value of more than 2.5 kOhm in the frequency range of 20 kHz to 1106 kHz.

In relation to the first power supply/transmitter block 11a of FIG. 4, the overall impedance value Z across the drain terminals of the transistors M1 and M2 is given as:

$$Z = R1 + R2//Rout1 + Rout2//R3 + R4$$

where:

Rout1 and Rout2 are the equivalent resistances of the transistors M1 and M2;

This value should agree with the international specifications expressed by the graph of FIG. 5.

The impedance for the second power supply/transmitter block 11b can be similarly computed.

It follows of necessity that the output impedance of the MOS transistors must be sufficiently high, which would occur when they operate in the saturation range.

In the embodiment of FIG. 4, the dissipated power Pdiss for the MOS transistor pairs 12, 12' is to be computed, for a given supply current referred to hereinafter as the loop current ILOOP flowing through the substitutive circuit 11, as follows:

$$(VdsPch + VdsNch) \times ILOOP = Pdiss$$

where:

VdsPch is the difference in voltage between the drain and source terminals of the PMOS transistors in the first pair 12; and VdsNch is the difference in voltage between the drain and source terminals of the NMOS transistors in the second pair 12'.

In view of that the MOS pairs operate in the saturation range and are in a diode configuration, it follows that the voltage difference Vds between the drain and source terminals will be the same as the voltage difference Vgs between the gate and source terminals.

The latter takes a value equal to the threshold voltage value VT plus an overdrive voltage dependent on the current ILOOP.

For example, in a practical situation simulated by the Applicant for a manufacturing process with mixed technology of the BCD type, the voltage Vds=Vgs+Voverdrive in an RM emergency condition (ILOOP≅12 mA) is about 2V for the pair 12' and about 1.6V for the pair 12, at room temperature; therefore, the power dissipated through the substitutive circuit 11 at room temperature is of 43 mW.

The effect of temperature on the threshold voltage VT should be added to this value.

A basic requirement of the substitutive circuit 11 with transformer function is that the dissipated power Pdiss be minimized. It is therefore necessary to keep the voltage difference Vds between the drain and source terminals of the MOS transistors employed as low as congruous with the above impedance requirements.

It readily follows, from the working conditions in the saturation range set by relations (1.1) and (1.2), that it is possible, in theory, to reduce the voltage difference Vds between the drain and source terminals to a value:

$$Vds = Vgs - VT$$

where:

Vds is the voltage difference between the drain and source terminals of the MOS transistors employed;

Vgs is the voltage difference between the gate and source terminals of the MOS transistors employed; and VT is the threshold voltage of the MOS transistors employed.

Figure 6:
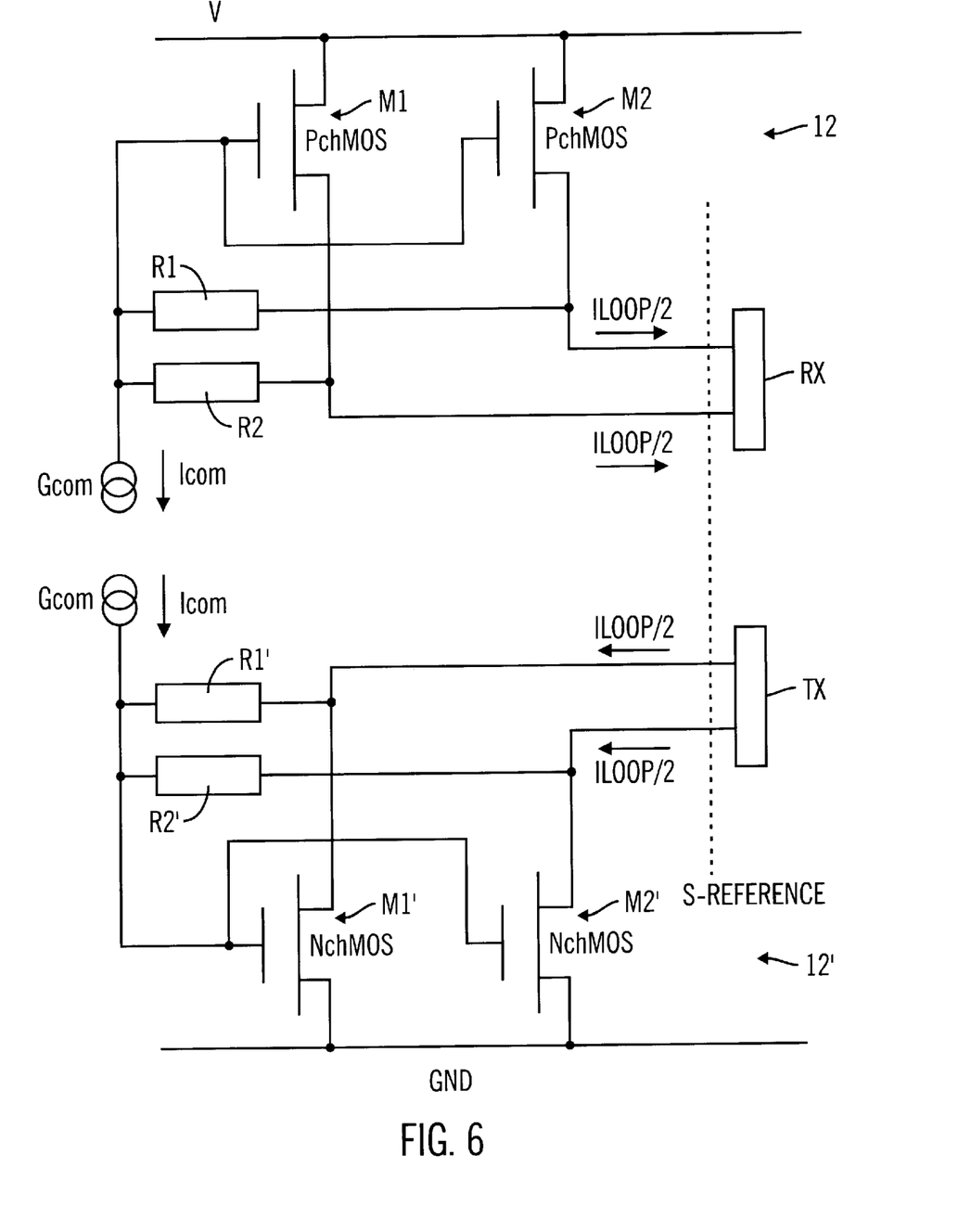
FIG. 6 shows in detail an improvement in the substitutive circuit of FIG. 4, including reduced voltage drop MOS transistors for a suitable limitation on dissipated power.

A first action toward minimizing the power dissipated through the MOS pairs is to extract or inject an appropriate compensation current Icom (homogeneous with the variations in the connection resistors R1, R2 and R1', R2') so as to obtain a constant voltage drop across these connection resistors R2, R2 and R1', R2' forming the diode connection, which should then be subtracted from the voltage Vds, as shown schematically in FIG. 6 in relation to the first 12 and second 12' diode-configured transistor pairs only.

This action can be easily implemented by having a suitable compensation current generator Gcom connected across the connection resistors R1, R2 and R1', R2'.

In this way, however, it would be difficult to compensate for variation of the threshold VT of the transistors M1, M2 and M1', M2' with temperature, and it therefore becomes necessary to provide a safe margin voltage to maintain the MOS transistors employed within the saturation range.

Figure 7:
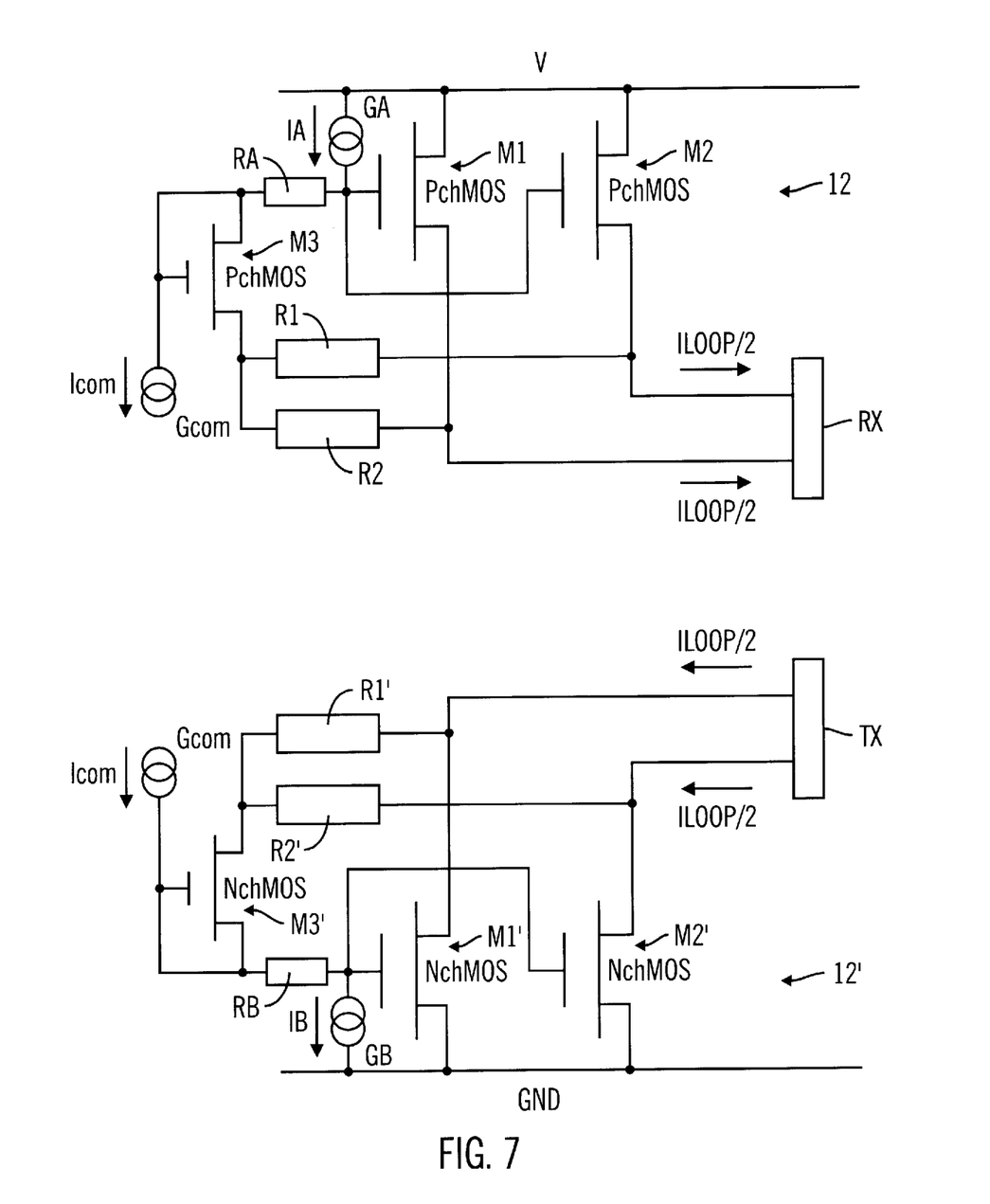
FIG. 7 shows a further improvement in the detail of FIG. 6, including additional components that make the substitutive circuit of FIG. 4 independent from the temperature and unaffected by process variations or "spread".

To obviate this, according to the invention, a MOS component of the same type as the transistors used in the PMOS pair 12 and NMOS pair 12' is advantageously provided, in series with the connection resistors R1, R2 and R1', R2' forming the diode connection of transistors M1, M2 and M1', M2'.

Specifically, first M3 and second M3' compensation transistors are included, as schematically shown in FIG. 7.

The first compensation transistor M3 has its gate terminal connected to its drain terminal, and connected to the compensation current generator Gcom, its drain terminal being further connected to the common gate terminal of the first M1 and second M2 transistors in the pair 12 through a first matching resistor RA, and connected to the voltage reference V through a first match current generator GA; the transistor source terminal being connected to the connection resistors R1 and R2.

In the same way, the second compensation transistor M3' has its gate terminal connected to its drain terminal, and connected to the compensation current generator Gcom, its drain terminal being further connected to the common gate terminal of the first M1' and second M2' transistors in the pair 12' through a second matching resistor RB, and connected to the ground reference GND through a second match current generator GB; the transistor source terminal being connected to the connection resistors R1' and R2'.

Thus, the transistors M3 and M3' are in a diode configuration, and have a voltage drop which is virtually the same as VT.

The detail schematic of the substitutive circuit 11 in FIG. 7 illustrates a simplification which affords improved relative flexibility while leaving the foregoing concepts, on which the invention stands, unaltered.

The additional resistors RA and RB and their associated current generators GA and GB allow the voltages across the connection resistors R1, R2 and R1', R2' to be modulated for optimum adjustment at the manufacturing stage of the substitutive circuit 11.

Thus, the voltage Vds at the MOS transistor pairs 12 and 12' can be significantly reduced, resulting in a reduction of the power Pdiss dissipated through the substitutive circuit 11.

Also, with the improved scheme of FIG. 7, all the effects of temperature on the threshold voltage VT of the transistors employed are inherently canceled.

By this expedient, even those variations or "spread" in the manufacturing process which are hard to remove, are inherently canceled, in favor of repeatability of the substitutive circuit 11 and the termination network 1 as a whole.

The power dissipated through the pairs 12 and 12' after introducing the transistors M3 and M3', for a loop current ILOOP of 12 mA, may be for example:

$$Pdiss = (VdsPch' + VdsNch') \times ILOOP = (1.25 + 0.75) \times 12 = 24 \text{ mW}$$

where:

VdsPch' is the voltage difference between the drain and source terminals of the PMOS transistors in the first pair 12, as connected to the first transistor M3; and VdsNch' is the voltage difference between the drain and source terminals of the NMOS transistors in the second pair 12', as connected to the second transistor M3'.

A reduction of 56% with respect to the simple diode-connection of the basic embodiment schematically shown in FIG. 4 is thus obtained.

A further contribution to reducing the voltage drop Vds across each of the MOS transistor pairs 12, 12' may also come from a suitable dimensioning of the individual transistors M1, M2 and M1', M2' in the pairs 12 and 12'.

As the geometries of these transistors are increased, and for a given loop current ILOOP, the voltage Vds can be decreased, while being careful, however, to keep the transistors M1, M2 and M1', M2' within their saturation range, for best compromise size/dissipated power.

Figure 8:
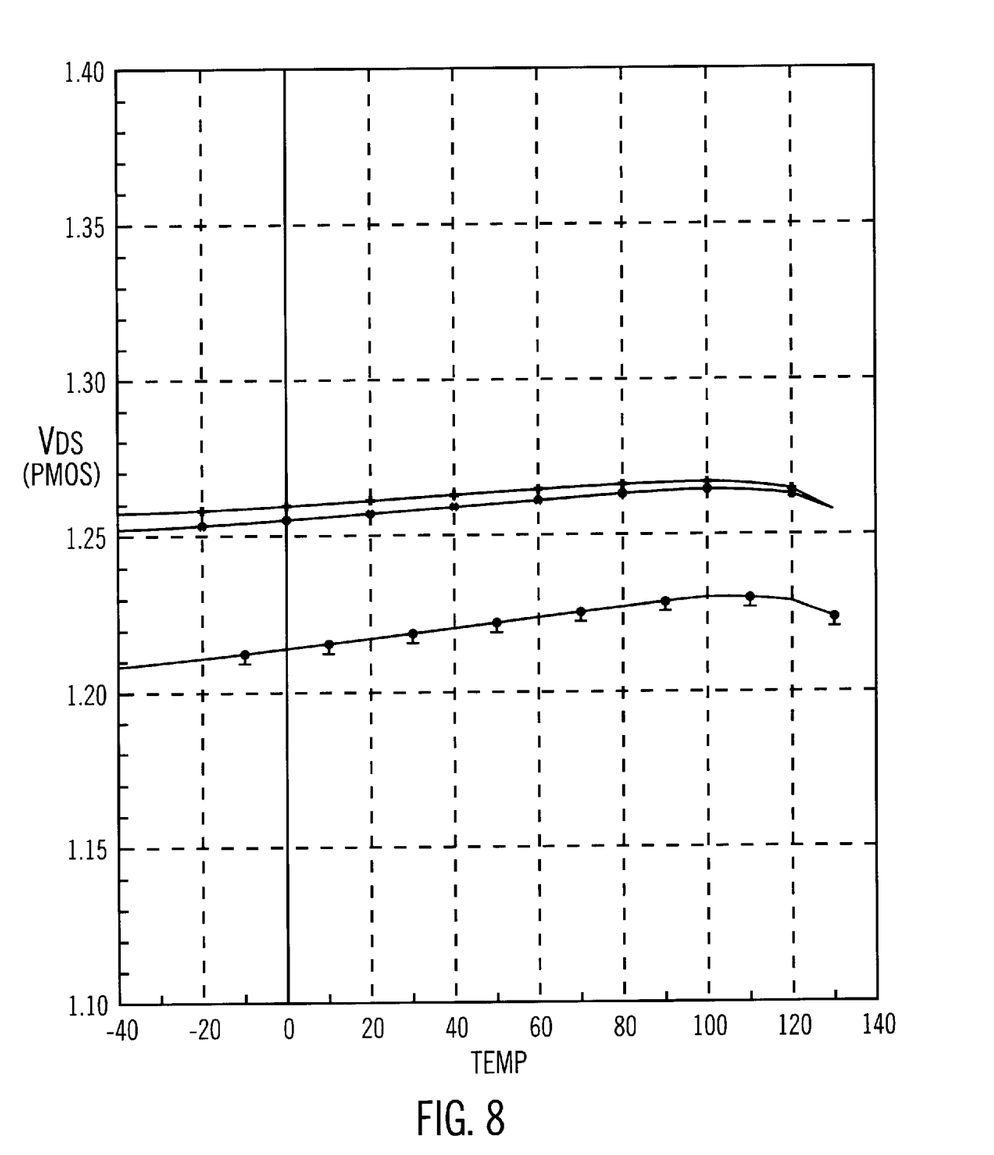
FIGS. 8 and 9 are plots vs. temperature of respective parameters of the network termination according to the invention.
Figure 9:
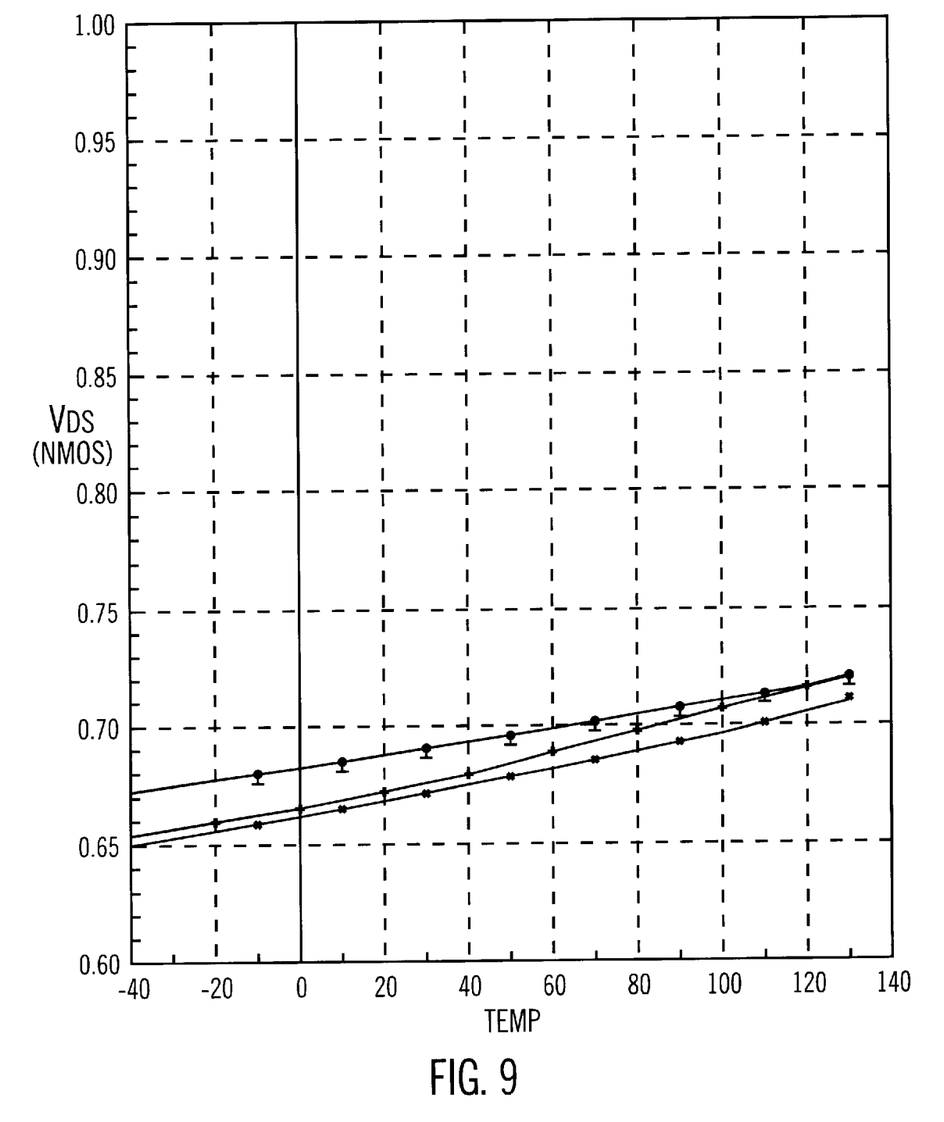

FIGS. 8 and 9 show plots versus temperature of the parameter expressing the voltage difference Vds between the drain and source terminals of the PMOS transistors in the first pair 12 and the NMOS transistors in the second pair 12', respectively, as obtained from a suitable simulation carried out by the Applicant under different conditions tied to process variations.

The substitutive circuit 11 of this invention allows the gains of both the first RX and the second TX data interface to be matched in a flexible manner compared to the transfomers used in the prior art. In fact, this change in gain can be achieved by merely varying the resistances of the resistors used.

In addition, the reversal of polarity (in the RM or restricted mode emergency condition) is provided by active components over a different current path, without additional relays.

Finally, the substitutive circuit 11 and the control and driving switch configuration 100 of this invention afford control over the loop current ILOOP and a limitation on the latter, by the added provision of dedicated circuits, such as the sensing resistor Rgnd, within the device.

In conclusion, the foregoing expedients affecting both the first pair 12 of PMOS transistors and the second pair 12' of NMOS transistors can provide a low voltage drop, high transistor output impedance, and low current consumption by using components of the MOS type, thereby ensuring a low dissipated power which is constant with temperature and unaffected by process variations.

Further advantages of the substitutive circuit 11 and the control and driving switch configuration 100 of this invention are:

reduced manufacturing costs, in view also of a homogeneous assembly with all the other dedicated circuits;

ready elimination of any electromechanical relays for polarity reversal, and replacement thereof with active components, specifically MOS transistors;

possible introduction of additional functions, such as matching the gains of the first RX and second TX data interfaces.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A MOS transistors substitutive circuit having a transformer/data interface function for ISDN networks, said substitutive circuit comprising:

a voltage reference terminal;

a supply voltage reference terminal;

a ground potential reference terminal;

a first data interface;

a second data interface;

a first power supply/transmitter block, the first power supply/transmitter block being connected between the voltage reference terminal and the first data interface, and being further connected to the supply voltage reference terminal, the first power supply/transmitter block including:

a first MOS transistor coupled between the voltage reference terminal and the first data interface, and being diode configured; and a second MOS transistor coupled between the voltage reference terminal and the first data interface, and being diode configured; and a second power supply/transmitter block, the second power supply/transmitter block being connected between the ground potential reference terminal and the second data interface, and being further connected to the supply voltage reference terminal, the second power supply/transmitter block including:

a third MOS transistor coupled between the ground potential reference terminal and the second data interface, and being diode configured; and a fourth MOS transistor coupled between the ground potential reference terminal and the second data interface, and being diode configured, wherein the first and second power supply/transmitter blocks emulate transformers for an ISDN telephone line by performing the data interface function of transmitting data presented on the line and the transformer function of transmitting a power supply to a terminal apparatus, while satisfying the ISDN network interface circuit requirements for low power dissipation.

2. The MOS transistors substitutive circuit of claim 1, wherein the first, second, third, and fourth MOS transistors are all held in their saturation range, so as to have a high A.C. impedance and virtually zero D.C. impedance that minimizes power dissipation through the substitutive circuit.

3. The MOS transistors substitutive circuit of claim 1, wherein:

the circuit can be operated in a first condition of operation in which the voltage reference terminal is connected to a remote supply voltage characterized by a first current polarity and the presence of a polarity reverse control signal; and the circuit can be operated in a second condition of operation in which the voltage reference terminal is connected to an emergency voltage characterized by a second current polarity that is reversed from the first current polarity and the absence of the polarity reverse control signal.

4. The MOS transistors substitutive circuit of claim 1, wherein the first and second MOS transistors are of a first conductivity type, and the third and fourth MOS transistors are of a second conductivity type.

5. The MOS transistors substitutive circuit of claim 4, wherein the first, second, third, and fourth MOS transistors are realized in integrated circuit form using a conventional mixed technology of the BCD type.

6. A MOS transistors substitutive circuit having a transformer/data interface function for ISDN networks, said substitutive circuit comprising:

a voltage reference terminal;

a supply voltage reference terminal;

a ground potential reference terminal;

a first data interface;

a second data interface;

a first power supply/transmitter block, the first power supply/transmitter block being connected between the voltage reference terminal and the first data interface, and being further connected to the supply voltage reference terminal;

a second power supply/transmitter block, the second power supply/transmitter block being connected between the ground potential reference terminal and the second data interface, and being further connected to the supply voltage reference terminal;

a first MOS transistor coupled between the voltage reference terminal and the first data interface, and being diode configured;

a second MOS transistor coupled between the voltage reference terminal and the first data interface, and being diode configured;

a third MOS transistor coupled between the ground potential reference terminal and the second data interface, and being diode configured;

a fourth MOS transistor coupled between the ground potential reference terminal and the second data interface, and being diode configured;

a first connection resistor, connected between the gate of the first MOS transistor and the lead of the first MOS transistor which is coupled to the first data interface such that the first MOS transistor is diode configured through the first connection resistor;

a second connection resistor, connected between the gate of the second MOS transistor and the lead of the second MOS transistor which is coupled to the first data interface such that the second MOS transistor is diode configured through the second connection resistor;

a third connection resistor, connected between the gate of the third MOS transistor and the lead of the third MOS transistor which is coupled to the second data interface such that the third MOS transistor is diode configured through the third connection resistor; and a fourth connection resistor, connected between the gate of the fourth MOS transistor and the lead of the fourth MOS transistor which is coupled to the second data interface such that the fourth MOS transistor is diode configured through the fourth connection resistor.

7. A control and driving switch configuration for substitutive transformer/data transmitter circuits in a network termination for an ISDN network, the network termination comprising a first converter connected to a ground potential reference terminal, delivering a supply voltage and an emergency voltage, and a second converter connected to the ground potential reference terminal, delivering a remote supply voltage, the configuration comprising:

at least a first and a second MOS transistors substitutive circuit according to claim 1, which circuits respectively operate in a first condition of operation of the network termination characterized by a first current polarity and the presence of a polarity reverse control signal, and a second condition of operation of the network termination characterized by a second current polarity that is reversed from the first current polarity and the absence of the polarity reverse control signal.

8. The control configuration of claim 7, further comprising:
   a first data interface;
   a second data interface; and
   a signal line, wherein the first MOS transistors substitutive circuit is connected to the signal line whereon is present the polarity reverse control signal which is generated by the second converter of the network termination, and is connected to the first data interface, and wherein the second MOS transistors substitutive circuit is connected to the signal line, and is connected to the second data interface.

9. The control configuration of claim 8, wherein:
   the configuration further comprises a first logic inverter and a second logic inverter; and
   the first MOS transistors substitutive circuit further comprises:
      a first normal supply block, receiving the remote supply voltage from the second converter, and being connected to the signal line through the first logic inverter and to the first data interface; and
      a second normal supply block being connected to the signal line through the second logic inverter, and connected to the second data interface.

10. The control configuration of claim 9, wherein:
   the configuration further comprises a current limiter; and
   the second MOS transistors substitutive circuit comprises:
      a first emergency supply block, receiving the emergency voltage from the first converter through the current limiter, and being connected to the second normal supply block and to the second data interface; and
      a second emergency supply block, connected to the first normal supply block and to the first data interface.

11. The control configuration of claim 10, wherein in the first condition of operation of the network termination, the remote supply voltage is present, which voltage passes through the first normal supply block to the first data interface, and from the second data interface to the ground potential reference terminal through the second normal supply block.

12. The control configuration of claim 11, wherein in the second condition of operation of the network termination, the emergency voltage is present, and the polarity reverse control signal present on the signal line enables the emergency supply blocks and disables the normal supply blocks through the first and second logic inverters.

13. The MOS transistors substitutive circuit of claim 6, wherein:
   the gates of the third and fourth MOS transistors are connected together;
   the lead of the third MOS transistor which is coupled to the second data interface is the drain;
   the lead of the fourth MOS transistor which is coupled to the second data interface is the drain;
   the sources of the third and fourth MOS transistors are both coupled to the ground potential reference terminal; and
   the second power supply/transmitter block comprises the third and fourth MOS transistors.

14. The MOS transistors substitutive circuit of claim 13, further comprising a sensing resistor disposed between the ground potential reference terminal and the source terminals of the third and fourth MOS transistors.

15. The MOS transistors substitutive circuit of claim 13, wherein the second power supply/transmitter block further comprises:
   a first current mirror, connected to the supply voltage reference terminal;
   a second current mirror, connected to the supply voltage reference terminal;
   a third current mirror, connected to the ground potential reference terminal and to the second current mirror; and
   a fourth current mirror, connected to the ground potential reference terminal and to the first current mirror.

16. The MOS transistors substitutive circuit of claim 15, wherein the second power supply/transmitter block further comprises:
   a first decoupling element, coupled to the first current mirror, the fourth current mirror, and the drain of the third MOS transistor, such that the first decoupling element is disposed between the drain of the third MOS transistor and both the first and fourth current mirrors;
   a second decoupling element, coupled to the second current mirror, the third current mirror, and the drain of the fourth MOS transistor, such that the second decoupling element is disposed between the drain of the fourth MOS transistor and both the second and third current mirrors;
   a first decoupling capacitor, coupled to the first current mirror, the fourth current mirror, and the second data interface, such that the first decoupling capacitor is disposed between the second data interface and both the first and fourth current mirrors;
   a second decoupling capacitor, coupled to the second current mirror, the third current mirror, and the second data interface, such that the second decoupling capacitor is disposed between the second data interface and both the second and third current mirrors; and
   wherein the first and second decoupling elements are utilized under particular conditions of power supply to the MOS transistors substitute circuit.

17. The MOS transistors substitutive circuit of claim 15, wherein the second power supply/transmitter block further comprises:
   a first decoupling resistor;
   a second decoupling resistor; and
   a buffer, the buffer being connected to the first and third current mirrors through the first decoupling resistor, and being connected to the second and fourth current mirrors through the second decoupling resistor.

18. The MOS transistors substitutive circuit of claim 17, further comprising a reference voltage reference terminal, and wherein the buffer is connected between the supply voltage reference terminal and the ground potential reference terminal, and is further connected to the reference voltage reference terminal, thereby setting an output reference voltage for all of the current mirrors, while the decoupling resistors are setting a suitable impedance for an A.C. signal presented to the second data interface.

19. The MOS transistors substitutive circuit of claim 15, wherein the second power supply/transmitter block further comprises a first voltage/current converter comprising a first input terminal which is connected to the first current mirror, and a second input terminal which is connected to the second current mirror.

20. The MOS transistors substitutive circuit of claim 6, wherein:
   the gates of the first and second MOS transistors are connected together;
   the lead of the first MOS transistor which is coupled to the first data interface is the drain;

the lead of the second MOS transistor which is coupled to the first data interface is the drain;

the sources of the first and second MOS transistors are both coupled to the voltage reference terminal; and the first power supply/transmitter block comprises the first and second MOS transistors.

21. The MOS transistors substitutive circuit of claim 20, further comprising a reference voltage reference terminal, and wherein the first power supply/transmitter block further comprises:

a second voltage/current converter comprising:
a first input;
a second input;
a first output;
second output;
first terminal connected to the supply voltage reference terminal; and
a second terminal connected to the ground potential reference terminal;

a third decoupling capacitor, disposed between the first input of the second voltage/current converter and the drain of the first MOS transistor;

a fourth decoupling capacitor, disposed between the second input of the second voltage/current converter and the drain of the second MOS transistor;

a first bias resistor, disposed between the first input of the second voltage/current converter and the reference voltage reference terminal; and a second bias resistor, disposed between the second input of the second voltage/current converter and the reference voltage reference terminal.

22. The MOS transistors substitutive circuit of claim 21, wherein the first power supply/transmitter block further comprises:

a fifth current mirror, connected to the first output of the second voltage/current converter and further connected to the supply voltage reference terminal; and a sixth current mirror, connected to the second output of the second voltage/current converter and further connected to the supply voltage reference terminal.

23. The MOS transistors substitutive circuit of claim 22, wherein the first power supply/transmitter block further comprises:

a control terminal;

a first amplifier circuit, connected to the fifth current mirror, the supply voltage reference terminal, the ground potential reference terminal, and the control terminal of the first power supply/transmitter block; and a second amplifier circuit, connected to the sixth current mirror, the supply voltage reference terminal, the ground potential reference terminal, and the control terminal of the first power supply/transmitter block.

24. The MOS transistors substitutive circuit of claim 23, wherein:

the first amplifier circuit comprises a resistor and an output terminal, and wherein there is present on the output terminal an A.C. signal output voltage which is proportional to the line voltage at the first data interface, the voltage being suitably modulatable by means of the fifth and sixth current mirrors and the resistor; and the second amplifier circuit comprises a resistor and an output terminal, and wherein there is present on the output terminal an A.C. signal output voltage which is proportional to the line voltage at the first data interface, the voltage being suitably modulatable by means of the fifth and sixth current mirrors and the resistor.

25. The MOS transistors substitutive circuit of claim 6, wherein:

the gates of the first and second MOS transistors are coupled together;

the gates of the third and fourth MOS transistors are coupled together;

the values of the first connection resistor and the second connection resistor are the same, thereby canceling, at the common gate terminal of the first MOS transistor and the second MOS transistor any differential signal at the first data interface, and the first MOS transistor and the second MOS transistor offering, therefore, a high impedance to differential signals; and the values of the third connection resistor and the fourth connection resistor are the same, thereby canceling, at the common gate terminal of the third MOS transistor and the fourth MOS transistor any differential signal at the second data interface, and the third MOS transistor and the fourth MOS transistor offering, therefore, a high impedance to differential signals.

26. The MOS transistors substitutive circuit of claim 6, further comprising a compensation current generator connected across the first, second, third, and fourth connection resistors for extracting and injecting a compensation current homogeneous with the variation of the connection resistors and, accordingly, obtaining a constant voltage drop across the connection resistors effective to further reduce the power dissipated through the substitutive circuit.

27. The MOS transistors substitutive circuit of claim 26, further comprising:

a first match resistor, connected to the gate terminals of the first and second MOS transistors;

a first compensation transistor, wherein the source terminal is connected to the first and second connection resistors, and the gate terminal is connected to the drain terminal, to the compensation current generator, and to the first match resistor, whereby the first compensation transistor is thus diode configured and has a voltage drop which virtually equals a MOS transistor threshold voltage, so as to compensate the threshold voltages of the transistors employed, with respect to temperature and process variations;

a second match resistor, connected to the gate terminals of the third and fourth MOS transistors; and a second compensation transistor, wherein the source terminal is connected to the third and fourth connection resistors, and the gate terminal is connected to the drain terminal, to the compensation current generator, and to the second match resistor, whereby the second compensation transistor is thus diode configured and has a voltage drop which virtually equals a MOS transistor threshold voltage, so as to compensate the threshold voltages of the transistors employed, with respect to temperature and process variations.

28. The MOS transistors substitutive circuit of claim 27, further comprising:

a reference voltage reference terminal;

a first match current generator, disposed between the reference voltage reference terminal and the first match resistor, such that the first compensation transistor has its source terminal connected to the reference voltage reference terminal through a series of the first match resistor and the first match current generator;

a second match current generator, disposed between the ground potential reference terminal and the second match resistor, such that the second compensation transistor has its source terminal connected to the ground potential reference terminal through a series of the second match resistor and the second match current generator; and wherein the first and second match current generators thus allow the voltages across the first, second, third, and fourth connection resistors to be modulated through the respective match resistors for optimum adjustment, at the manufacturing stage, of the substitutive circuit, a further reduction of the dissipated power, and inherent compensation of the effects of temperature and process variations on the threshold voltage of the transistors employed.

29. The MOS transistors substitutive circuit of claim 27 wherein:

the first and second MOS transistors comprise MOS transistors of a first type;

the third and fourth MOS transistors comprise MOS transistors of a second type; and the first compensation transistor is of the same type as the first and second MOS transistors, and the second compensation transistor is of the same type as the third and fourth MOS transistors.

30. A MOS transistors substitutive circuit having a transformer/data interface function, said substitutive circuit comprising:

a first data interface;

a second data interface;

a first power supply/transmitter block, the first power supply/transmitter block being connected between a voltage reference terminal and the first data interface, the first power supply/transmitter block including a first pair of diode configured MOS transistors coupled in parallel between the voltage reference terminal and the first data interface; and a second power supply/transmitter block, the second power supply/transmitter block being connected between a ground potential reference terminal and the second data interface, the second power supply/transmitter block including a second pair of diode configured MOS transistors coupled in parallel between the ground potential reference terminal and the second data interface.

31. The MOS transistors substitutive circuit of claim 30, wherein the source terminals of the two MOS transistors of the first pair of diode configured MOS transistors are connected in common.

32. The MOS transistors substitutive circuit of claim 31, wherein the source terminals of the two MOS transistors of the second pair of diode configured MOS transistors are connected in common.

33. The MOS transistors substitutive circuit of claim 30, wherein the gate terminals of the two MOS transistors of the first pair of diode configured MOS transistors are connected in common, and the gate terminals of the two MOS transistors of the second pair of diode configured MOS transistors are connected in common.

34. The MOS transistors substitutive circuit of claim 30, further comprising:

first and second transistors, wherein one MOS transistor of the first pair of diode configured MOS transistors has its gate terminal coupled to one terminal of the first resistor and its drain terminal coupled to the other terminal of the first resistor, and the other MOS transistor of the first pair of diode configured MOS transistors has its gate terminal coupled to one terminal of the second resistor and its drain terminal coupled to the other terminal of the second resistor.

* * * * *